United States Patent [19]

Goto

[11] Patent Number: 4,498,751
[45] Date of Patent: Feb. 12, 1985

[54] DISPLAY DEVICE FOR CAMERA

[75] Inventor: Tetsuro Goto, Kawasaki, Japan

[73] Assignee: Nippon Kogaku K.K., Tokyo, Japan

[21] Appl. No.: 610,187

[22] Filed: May 15, 1984

Related U.S. Application Data

[63] Continuation of Ser. No. 422,006, Sep. 23, 1982, abandoned.

[30] Foreign Application Priority Data

Nov. 20, 1981 [JP] Japan .................... 56-186694

[51] Int. Cl.³ .................... G03B 17/18; H05B 37/00
[52] U.S. Cl. .................... 354/289.1; 354/465; 354/484; 350/345; 340/815.3; 362/23
[58] Field of Search .................... 354/53, 60 E, 60 L, 354/289, 465, 466, 468–475, 289.12, 289.1, 484; 340/815.01, 815.3; 356/218; 350/345

[56] References Cited

U.S. PATENT DOCUMENTS 4,142,786  3/1979  Suzuki et al. .................... 354/472 X
4,208,869  6/1980  Hanaoka .................... 350/345 X
4,387,977  6/1983  Uchidoi et al. .................... 354/60 E X Primary Examiner—William B. Perkey
Attorney, Agent, or Firm—Shapiro and Shapiro

[57] ABSTRACT

A display device for a camera constructed with a display switch to drive a display element in the camera by the first manual operation, and an illuminating switch to drive an illuminating device to illuminate the display device by the second manual operation, the display element being ensured its driving, while the illuminating device is being driven by the second manual operation.

15 Claims, 3 Drawing Figures

DISPLAY DEVICE FOR CAMERA

This application is a continuation of U.S. application Ser. No. 422,006 filed on Sept. 23, 1982, now abandoned.

BACKGROUND OF THE INVENTION

1. Field of the Invention

The present invention is concerned with a display device for a camera, which makes indications of exposure informations, etc. within a view-finder or any other designated place.

2. Description of the Prior Art

There have so far been known various meters and liquid crystal elements to be used as the display element in such camera display device.

Since these display elements do not emit light by themselves, their observation is difficult when the surrounding is dark. In order, therefore, to make it possible to read those informations as displayed in the dark, there has been known a display device, in which a lighting device to illuminate the same is incorporated. One type of the display device having this illuminating device is such that the display device is driven by a switch means which is closed during half-depression of a shutter release button and for a predetermined period of time after the shutter button being freed from its half-depressed condition, while the illuminating device is driven by another switch which is closed only during its depression. However, this display device is of such a construction that, in spite of the illuminating switch being closed by its depression, the illuminating device stops its driving as soon as the display element stops its driving after lapse of a predetermined time. That is to say, the display element becomes disadvantageously unable to be observed against the will of an operator who wishes to observe the display element. To overcome this shortcoming, the half-depression of the shutter release button and the depression of the lighting switch may be done simultaneously. However, this simultaneous pushing of the shutter release button and the lighting switch makes it impossible to effect other operations necessary for the photo-taking.

As another type of the display device, there has been known one, wherein both display element and illuminating device are synchronously driven by a switching means which is closed during the half-depression of the shutter release button, and during a predetermined period of time after release of its half-depression. This device is given such a construction that, when the surrounding is bright and no illuminating device is necessary, it is disconnected from the power source by operating a separate change-over switch. By this construction, the above-mentioned shortcoming in the display device is overcome. Nevertheless, when the surrounding is bright, the light from the lighting device becomes not so conspicuous to the operator, which often causes him (or her) to forget to operate the change-over switch, and to continue the photo-taking operation with the lighting device being turned on, in waste, without noticing it. Since the illuminating device consumes relatively large current for driving an incandescent lamp, LED, and so on, such waste lighting results in curtailment of the life of a battery for the camera with limited capacity.

SUMMARY OF THE INVENTION

It is therefore an object of the present invention to provide a display device for a camera, which solves the afore-described shortcomings and is excellent in its operability.

DETAILED DESCRIPTION OF THE PREFERRED EMBODIMENTS

In the following, the present invention will be explained in detail with reference to the preferred embodiments thereof as shown in the accompanying drawing.

Figure 1:
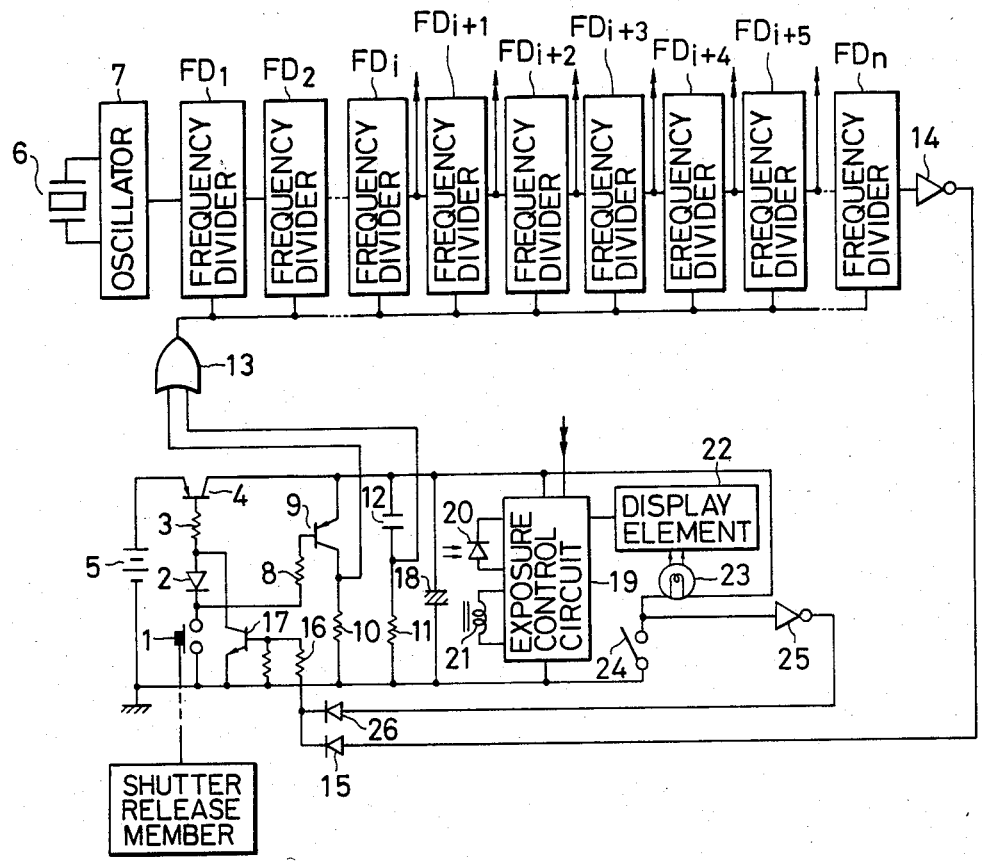
FIGS. 1, 2 and 3 respectively show the first, second and third embodiments of the present invention.

Referring first to FIG. 1, a display switch 1 is a self-return type, is closed during manual operation being applied thereto, and returns to its original position upon release of the manual operation. It should be understood here that the switch is closed only during half-depression of a shutter release member (button) of a camera, shown diagrammatically. By closure of the switch 1, power supply commences to the entire circuit from a power source 5 through a transistor 4 which is turned on by a diode 2 and a resistor 3. The basic frequency put out of a quartz vibrator 6 and an oscillator 7 is divided by frequency dividers $FD_1, FD_2, \ldots FD_n$. These quartz vibrator 6, oscillator 7 and frequency dividers $FD_1$–$FD_n$ constitute a timer circuit. A resistor 8, a transistor 9, resistors 10 and 11, a capacitor 12, and an OR gate 13 constitute a reset circuit. This reset circuit functions to reset the frequency dividers $FD_1$–$FD_n$ in the timer circuit when the switch 1 is closed. When the switch is put in an open condition, the reset circuit releases the reset condition, whereby the frequency dividers $FD_1$–$FD_n$ commence counting of an output from the oscillator 7. Upon completion of the counting, the timer circuit turns the transistor 4 to an "off"-condition through an inverter 14, a diode 15, a resistor 16, a transistor 17, and the resistor 3, whereby the current supply stops. Further, the frequency dividers $FD_1$–$FD_n$ in the timer circuit are also reset by a circuit (not shown) even at the time of travelling of the front screen due to the shutter release, thereby generating an output to set a shutter timing. A reference numeral 18 designates a by-pass capacitor. An aperture-priority type automatic exposure control circuit 19 introduces therein to an input information on brightness of a photographic object from a light receiving element 20, an input information on sensitivity of a photographic film (not shown) and an input information on an aperture condition, and calculates a shutter speed. On the basis of this calculation, an output corresponding to an appropriate shutter timing is selected from those outputs from the frequency dividers $FD_1$–$FD_n$ to cause the rear screen to travel by a magnet 21, thereby controlling the shutter speed. The exposure control circuit 19 also includes a display drive circuit, by which a display element 22 is operated. A lamp 23 and a lighting switch 24 constitutes an illuminating device. The switch 24 is of a self-return type and is closed only during a period when manual operation is applied thereto. It should be understood here that the switch 24 is such one that is closed only while it is being depressed. The display element 22 can be illuminated only when the power supply is being done throughout the circuit by way of the transistor 4 from the power source 5. The illuminating device, during illumination of the display element 22, turns on the transistors 17 and 4 through the inverter 25, the diode 26 and the resistor 16 to thereby supply the electric current to the whole circuit, and ensure the operation of the display element 22.

In the following, operations of the above-described circuit will be explained, in the first place, with respect to a case where the lamp 23 does not illuminate the display element.

To begin with, the shutter release button is half-depressed to close the display switch 1, whereupon the transistor 4 is turned on through the diode 2 and the resistor 3, and the current supply from the power source 5 to the entire circuit is started by way of the transistor 4. Subsequently, positive differential pulses are generated at a connection between the capacitor 12 and the resistor 11, whereby an output from the OR gate 13 takes a high signal level, and resets the frequency dividers $FD_1$-$FD_n$. As the consequence of this, an output from the frequency divider $FD_n$ assumes a low signal level, while an output from the inverter 14 takes a high signal level, whereby the transistor 17 is turned on. By the switch 1 being closed, the transistor 9 is turned on, and a high level voltage determined by the resistor 10 is applied to the OR gate 13 to render the output therefrom to be at a high signal level and to maintain the frequency dividers, $FD_1$-$FD_n$ in the timer circuit in their reset condition.

Following the above operations, even if the shutter release button is freed from its half-depressed condition by taking an operator's finger away from the buttom to open the switch 1, the transistor 4 is kept in its "on"-condition because the transistor 17 still remains in its "on"-condition, so that the current supply is continued. Further, by this opening of the switch 1, the transistor 9 is turned off, and an output from the OR gate 13 assumes a low signal level to release the "reset"-condition of the frequency dividers $FD_1$-$FD_n$. Accordingly, the frequency dividers $FD_1$-$FD_n$ count an output from the oscillator 7, and, after lapse of a predetermined time, an output from the frequency divider $FD_n$ assumes a high signal level, while an output from the inverter 14 takes a low signal level, whereby the transistors 17 and 4 are brought to their "off"-conditions, and the current supply is stopped.

When the shutter of the camera is released by depressing the shutter release button to a further depth from its half-depressed condition, the frequency dividers $RD_1$ to $FD_n$ are reset again by a mechanism (not shown) to start counting from the beginning. The exposure control circuit 19 introduces thereinto input informations of brightness of a photographic object from the light receiving element 20 and input informations on film sensitivity and aperture opening from a mechanism (not shown), calculates an adequate shutter timing, selects an output of the corresponding timing from those outputs of the frequency dividers $FD_1$ to $FD_n$, and causes the rear screen to run at such adequate shutter timing by the magnet 21 to thereby control the shutter timing.

In the following, explanations will be given as to a case where the display element 22 is illuminated by the lamp 23 of the illuminating device. While the transistor 4 is being turned on, and the current supply is being done throughout the circuit, if the illuminating switch 124 is closed by a push-down operation, the lamp 123 gives out light to illuminate the display element 22. On the other hand, by closure of the switch 24, an output from the inverter 15 assumes a high signal level, whereby the transistor 17 is turned on through the diode 26 and the OR gate 13 to maintain the transistor 4 in its "on" condition. As the consequence of this, the current supply is continued and the display element 22 is ensured its operations. When the switch 24 is opened, the transistor 17 is turned off. In this instance, if it is assumed that a predetermined time has gone by since the opening of the switch 1 and that a low level output is generated from the inverter 14, the transistor 4 is immediately turned off to stop the current supply.

Figure 2:
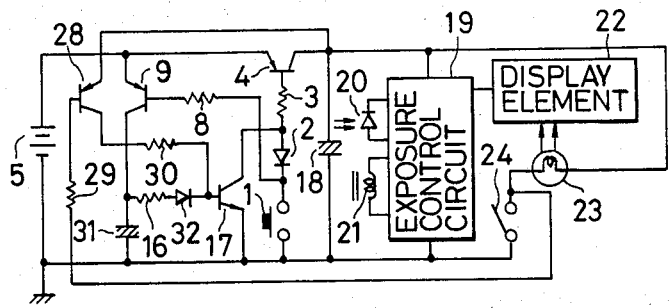

FIG. 2 show the second embodiment of the present invention. In the circuit shown, an RC circuit consisting of a resistor 30 and a capacitor is used as the timer circuit. Also, the exposure control circuit 19 effects setting of an adequate shutter timing by charging to and discharging from a capacitor (not shown).

In the following, operation of this embodimental circuit will be explained, it being understood that those parts having the same function as those in the first embodiment will be designated by the same reference numerals and explanations for them will be dispensed with.

In FIG. 2, when the switch 1 is closed, the transistor 4 is turned on to commence the power supply. Simultaneously with this, the transistor 9 is also turned on, and a capacitor 31 is charged. After this, when the switch 1 is opened, the transistor 9 is turned off. On the other hand, however, since electric charge in the capacitor 31 causes the transistor 17 to be turned on through the resistor 16 and a diode 32, the transistor 4 is kept in its "on" condition. Then, when the charged voltage in the capacitor 31 is discharged after lapse of a predetermined time, the transistors 17 and 4 are turned off to cease the power supply.

Before stoppage of the power supply, when the illuminating switch 24 is depressed to be closed, the lamp 23 is lighted to illuminate the display element 22, and, at the same time, a transistor 28 is turned on through a resistor 29. In this way, the "on"-condition of the transistors 17 and 4 can be maintained, even after lapse of a predetermined time to be determined by the RC circuits 16 and 31, so far as the display element 22 is illuminated by closure of the switch 24.

Figure 3:
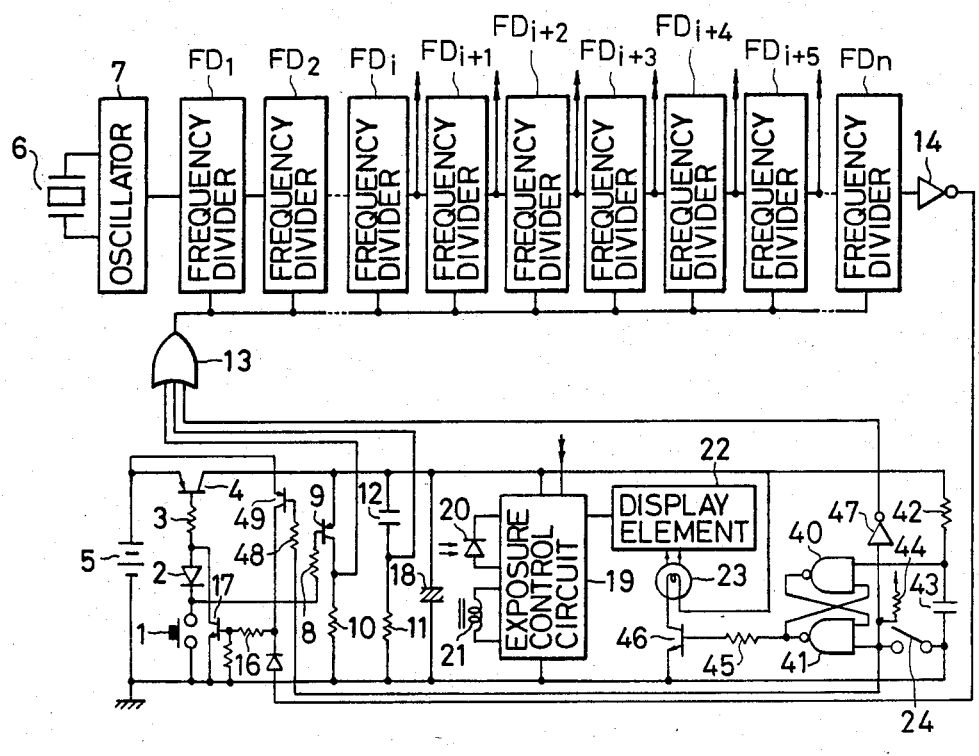

FIG. 3 illustrates the third embodiment of the present invention. Unlike the afore-described first and second embodiments, this third embodiment is able to start the power supply by closure of the illuminating switch 24, when no power supply is being conducted throughout the circuit, to thereby operate the display element 22 as well as to light up the lamp 23. Further, the operating conditions of the display element and the illuminating device are such that, even after opening of the switch 24, they may be retained for a predetermined time period by the action of the timer circuit.

In the following, operations of the third embodiment will be explained, it being understood that those parts having the same function as those in the first embodiment will be designated by the same reference numerals and their explanations are dispensed with, and that only those parts different from those in the previous embodiment will be described.

In FIG. 3, a flip-flop circuit composed of NAND circuits 40 and 41 is connected, at its reset terminal with an RC circuit made up of a resistor 42 and a capacitor 43, and, at its set terminal, with a pull-up resistor 44. In addition, the illuminating switch 24 is connected between the set terminal and the earth. In this construction, therefore, both set and reset terminals are usually at a high signal level. Output terminals of the flip-flop circuit are connected with the base of a transistor 46 through a resistor 45. The lamp 23 becomes able to be lighted up when the transistor 46 is turned on.

In the following, operations of the embodimental circuit will be explained. First of all, when the display switch 1 is closed, the transistor 4 is turned on by the same operations as in the first embodiment, and the power supply is commenced. When the switch 1 is opened, the time counting is started by the timer circuit, and, upon lapse of a predetermined time period, the output from the inverter 14 is reversed from a high signal level to a low level to thereby turn off the transistors 16 and 4 and discontinue the power supply.

On the other hand, an output from the above-mentioned RC circuit (42, 43) is reversed from a low signal level to a high level with a very slight delay in time from the commencement of the power supply, whereby the flip-flop circuits 40 and 41 are reset, and the outputs therefrom assume the low signal level. When the switch 24 is closed during the power supply being maintained by the timer circuit, the set input of the flip-flop circuit is reversed to a low level, and the output from the flip-flop circuit takes a high level. As the consequence of this, the transistor 46 is turned on, and the lamp 23 is lighted up to illuminate the display element 22. While the switch 24 is being closed, a high level output is sent out from the inverter 47 to the OR circuit 13, so that the timer circuit is in the reset condition and the current supply is maintained.

When the switch 24 is opened, the output from the inverter 47 is reversed to a low signal level, and the timer circuit commences the time counting, and stops the power supply to the entire circuit upon lapse of a predetermined time period.

In the following, explanations will be given as to a case where the illuminating switch 24 is closed from the beginning in a state of the power supply not being done to the entire circuit. When the switch 24 is closed, the transistor 49 is turned on through a resistor 48, whereby the transistors 17 and 4 are turned on to commence the power supply, and the display element 22 operates. At the same time, the lamp 23 is lighted up to illuminate the display element 22 to make it possible to observe the same.

This condition is maintained for a predetermined time by the action of the timer circuit, even after opening of the switch 24.

In the above-described embodiment, the time counting by the timer circuit has been done in response to release of the manual operation to the switch 1 (the switches 1 and 24 in the embodiment of FIG. 3). However, the present invention is not limited to this alone. For instance, the time counting may be started from an instant when the manual operation is applied to the switch.

As stated in the foregoing, the present invention ensures the operations of the display element while it is being illuminated, which makes it convenient for the operator to take photograph in a dark place without losing any good opportunity for photo-taking.

I claim:
1. Display device for camera, comprising:
   (a) display means;
   (b) a switch for display, said switch being of a self-return type and driving said display means at least while manual operation is being applied thereto;
   (c) illuminating means capable of illuminating said display means;
   (d) a switch for illumination, said switch being separate from said display switch and also of a self-return type, and driving said illuminating means at least while manual operation is being applied thereto; and
   (e) holding means to hold the driving condition of said display means while manual operation is being applied to said illuminating switch.

2. The display device as set forth in claim 1, wherein said display switch is associated with a shutter release member of the camera, said shutter release member being operable in the first stroke and the subsequent second stroke to start the shutter release operation, and said display switch being operated in accordance with the first stroke of said shutter release member to drive said display means.

3. The display device as set forth in claim 1, further comprising means for driving said illuminating means only when said illuminating switch is manually operated during operation of said display means.

4. The display device as set forth in claim 1, further comprising means for driving said display means in accordance with manual operation applied to said illuminating switch.

5. The display device as set forth in claim 1, further comprising time counting means for display, said means commencing time counting in association with the manual operation to said display switch, maintaining the driven condition of said display means, and generating an output upon lapse of a predetermined time to stop the driving of said display means, and said holding means maintaining the driven condition of said display means during operation of said illuminating means irrespective of said output from said time counting means for display.

6. The display device as set forth in claim 5, wherein said time counting means for display commences the time counting in accordance with release of the manual operation effected on said display switch.

7. The display device as set forth in claim 4, further comprising time counting means for display and illumination, said means commencing the time counting in association with the manual operation effected on said display switch and maintaining said display means in the driven condition, and generating an output upon lapse of a predetermined time to stop driving of said display means; and said time counting means for display and illumination also commencing the time counting in accordance with release of the manual operation to said illuminating switch and maintaining both said display means and said illuminating means in the driven conditions, and generating an output upon lapse of a predetermined time to stop driving of said both means.

8. The display device as set forth in claim 7, wherein said time counting means for display and illumination commences the time counting in accordance with release of the manual operation effected on said display switch.

9. Display device, comprising:
   (a) display means capable of displaying predetermined information;
   (b) a switch for display, said switch driving said display means to display the predetermined information at least while manual operation is being applied to the display switch;

(c) illuminating means capable of illuminating said display means;
(d) a switch for illumination, said switch being separate from said display switch and driving said illuminating means at least while manual operation is being applied thereto; and
(e) holding means to hold the driving condition of said display means while manual opeeration is being applied to said illuminating switch.

10. The display device as set forth in claim 9, further comprising means for driving said display means to display said predetermined information in association with manual operation applied to said illuminating device.

11. The display device as set forth in claim 9, further comprising time counting means for display, said means commencing time counting in association with manual operation to said display switch and maintaining the driven condition of said display means until lapse of a predetermined time interval from commencing the time counting.

12. The display device as set forth in claim 11, wherein said time counting means commences time counting in association with manual operation to said illumination switch and maintains the driven condition of said display means to display said predetermined information until lapse of a predetermined time from commencing the time counting.

13. The display device as set forth in claim 9, further comprising time counting means for illumination, the illumination time counting means commencing time counting in association with manual operation to said illumination switch and maintaining the driven condition of said illumination means to illuminate said display means until lapse of a predetermined time interval from commencing the time counting, and wherein said holding means makes said display means display said predetermined information while said illuminating means illuminates said display means.

14. The display device as set forth in claim 13, wherein said illumination time counting means commences time counting in association with manual operation to said display switch and maintains the driven condition of said illumination means to illuminate said display means until lapse of a predetermined time interval from commencing the time counting.

15. The display device as set forth in claim 9, wherein said display means is associated with equipment used for photography.

* * * * *